July 7, 1942.  R. R. KENWORTHY  2,288,807

AUTOMOBILE HEAD LAMP TESTING APPARATUS

Filed Dec. 22, 1939  5 Sheets-Sheet 1

INVENTOR.
ROBERT R. KENWORTHY
BY
*Leo Edelson*
ATTORNEY.

July 7, 1942.　　　R. R. KENWORTHY　　　2,288,807
AUTOMOBILE HEAD LAMP TESTING APPARATUS
Filed Dec. 22, 1939　　　5 Sheets-Sheet 3

INVENTOR.
ROBERT R. KENWORTHY
BY Leon Edelson
ATTORNEY.

Patented July 7, 1942

2,288,807

UNITED STATES PATENT OFFICE 2,288,807

AUTOMOBILE HEAD LAMP TESTING APPARATUS

Robert R. Kenworthy, Philadelphia, Pa., assignor, by mesne assignments, to Robert R. Kenworthy, William A. Schnader, and James M. Brittain, all of Philadelphia, Pa., trustees Application December 22, 1939, Serial No. 310,545

16 Claims. (Cl. 88—14)

This invention relates to apparatus for testing the efficiency and operating characteristics of lamps in general and more particularly to an improved construction of apparatus for testing and facilitating the adjustment of headlights such as are used in automotive vehicles.

Among the principal objects of the present invention is to provide an apparatus which determines by instrument reading, rather than by human sight, any deviations from required standards established by law of the positional adjustment of the light beam, the apparatus being provided with means for determining not only horizontal and vertical deviations of the light beam from predeterminedly established standards but also inaccuracies in the adjustment of the light source along the focal axis of the headlight reflector. Having so determined the deviations from normal of the light beam of a given make of head-light, the apparatus of the present invention is then employed to effect the necessary adjustments in the lighting unit to conform it to predetermined settings as regards particularly the reflector and the lamp bulb considered individually and together as a unit.

Another object of the present invention is to provide a head-light testing apparatus of such design and construction and of such operating characteristics that it may be positioned immediately in front of the particular head-light undergoing test and there manipulated to determine in what respects, if any, the head-light fails to meet the standard specifications and requirements of a properly adjusted head-light, the apparatus being provided in general with a positionally adjustable test reflector or target the axis of which is adjustable to bring it into coincidence with the axis of the head-light reflector being tested and with a "photronic" cell or other such light sensitive device which is influenced by the light rays reflected from the test reflector to indicate that coincidence of the test reflector and the reflector being tested has been effected. Having so positionally adjusted the axis of the test reflector or target, by the use of suitable indicating means provided in the apparatus readings are obtained showing any deviations from normal not only of the axis or geometric beam center of the reflector being tested, but also of the focal adjustment and light intensity of the lamp bulb and of the reflecting efficiency of the reflector per se.

More specifically, it is among the objects of the present invention to provide a portable, compact and efficient head-light testing apparatus having a plurality of controls for so positionally adjusting the aforesaid test reflector or target complementally to the head-light undergoing test that the said head-light may be adjusted with mathematical exactness to conform it to specifications predeterminedly established by law. These controls are operated not only to readjust the head-light for normal operation, but also to determine accurately the extent to which any given head-light fails to conform to the proper standards fixed for said type or make of head-light and the nature and probable cause of such failure. Consequently, if the defect is such as may be remedied by proper readjustment of the headlight as a unit or of the component parts thereof, such as the reflector or the lamp bulb, the present apparatus makes possible the correction of such defect expeditiously and with extreme accuracy. If, however, the defect is of such serious nature that mere readjustment of the head-light or parts thereof would be inadequate, the present apparatus functions to reveal such fact and so indicates that a replacement unit or part is required.

Other objects and advantages of the present invention will appear more fully hereinafter, it being understood that the invention consists substantially in the combination, construction, location and relative arrangement of parts, as shown in the accompanying drawings, as described more fully hereinafter and as finally pointed out in the appended claims. For the purpose of illustrating the invention, there is shown in the accompanying drawings one form of the apparatus which is at present preferred, since it has been found in practice to give satisfactory and reliable results, although it is to be understood that the various instrumentalities of which the invention consists can be variously arranged and organized and that the invention is not intended to be limited to the precise arrangement and organization of the instrumentalities as herein shown and described.

Referring now to the drawings and more particularly to Figures 3 to 10 thereof, it will be observed that the testing head 10 of the apparatus comprises in essence a cylindrically-shaped casing 11 within the interior of which is disposed a parabolic reflector 12 designed to receive the light rays emanating from the head-light being tested and reflect them to a "photronic" cell or similar light sensitive device 13 also located interiorly of the casing 11. Generally, the casing 11 is disposed with its longitudinal axis in a horizontal plane or substantially so, the front of the casing being provided with a perforated screen 14, the latter being preferably employed in order to reduce the intensity of the light beam sufficiently to permit the use of moderate range light sensitive cells and meters. The screen 14 may be dispensed with, however, in which event a light sensitive cell and meter would be employed which are more suitable for the higher intensity of light directed to and reflected from the test reflector or target 12.

Figure 3:
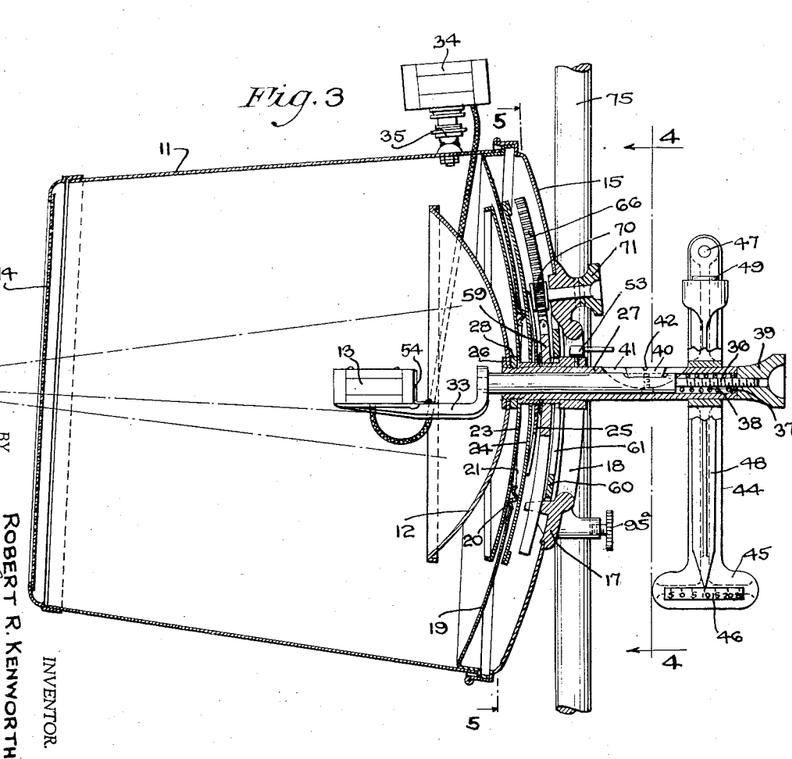
Figure 3 is a vertical cross-sectional view of the testing head as constructed in accordance with and embodying the principles of the present invention.
Figures 9, 10, 11, 12:
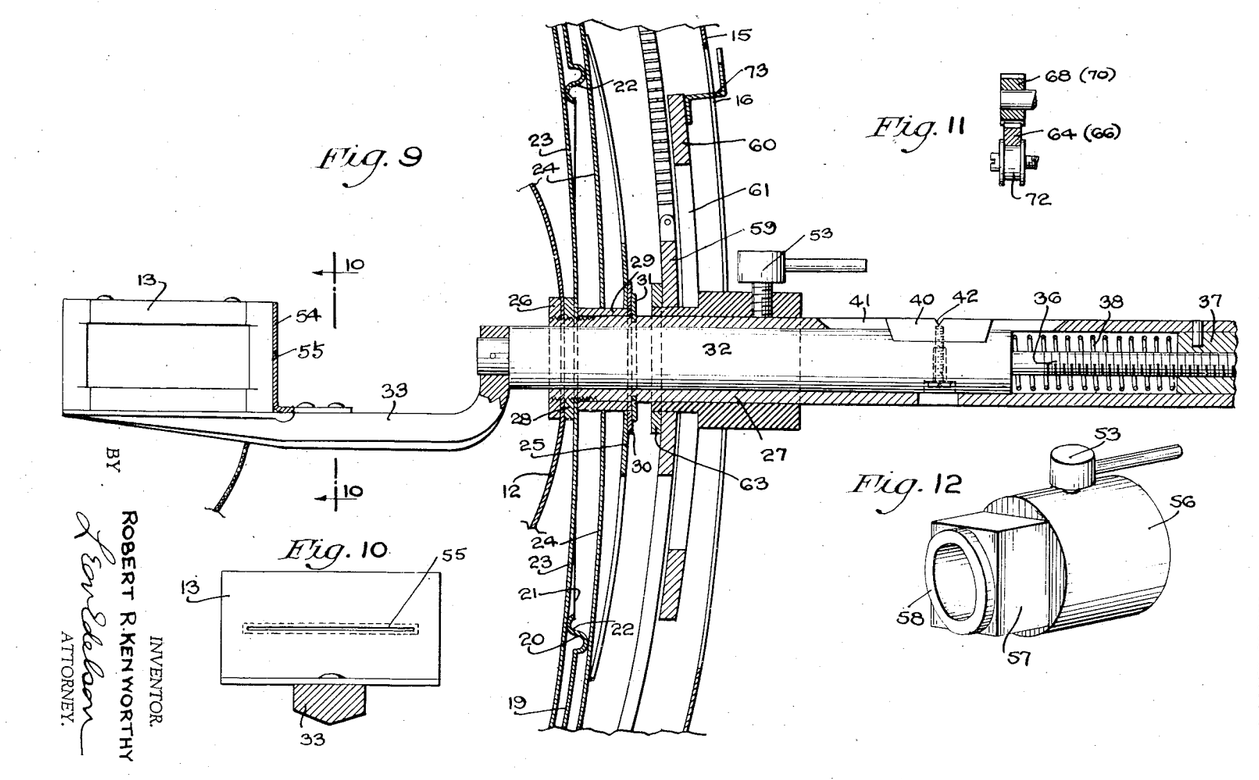
Figure 9 is an enlarged longitudinal sectional view showing internal constructional details of the testing head.
Figure 10 is a view of the "photronic" cell unit taken on the line 10—10 of Figure 9.
Figures 11 and 12 are views of constructional details employed in the testing head.

As appears most clearly in Figures 3 and 9, the rear of the casing 11 is enclosed by a removable cover plate 15 which serves not only as a support for the various controls of the apparatus but also as the means by which the testing head, as a unitary whole, is mounted upon its supporting frame. For reasons which will be apparent more fully hereinafter, the rear cover plate 15 is provided centrally therein with a square opening 16 within which is securely fitted a centrally apertured mounting plate 17, the aperture in the latter being designated by the numeral 18 (see Figures 3 and 4). Also secured within the rear of the casing 11 forwardly of the cover plate 15 is a centrally apertured dished supporting plate 19, the concavity of this latter plate being of about the same order as that of the external cover plate 15. The inner edge 20 of the plate 19 defining the central opening 21 therein is reversely shaped, as at 22 (see Figures 3 and 9), in order that said annular edge may serve as a spacer for maintaining in separated relation a pair of pressure plates 23 and 24 which are urged together, by means of a spring element 25, to clampingly engage between them the supporting plate 19. As will presently appear, the arrangement of the supporting plate 19 and the pressure plates 23 and 24 is such that the latter are free to be shifted as a unit in any direction relatively to the supporting plate 19 and in the plane thereof.

The test reflector or target 12 is securely fitted, as by the threaded nut 26, to the forward extremity of a tubular member 27 arranged with its longitudinal axis substantially in coincidence with the axis of the pressure plates 23 and 24. As appears most clearly in Figure 9, the tubular member 27 serves as a central hub for the test reflector 12 and the pressure plates 23 and 24, the plate 23 being locked in position to the member 27 by means of the nut 28 and the spacer 29, while the plate 24 freely embraces said spacer 29 and is resiliently urged towards the relatively fixed plate 23 by means of the spring element 25. Thus, it will be apparent that by shifting the tubular hub element 27 laterally of the casing axis, the reflector 12 will be carried therewith. In this connection, it is important to observe that any such shifting movement must necessarily be in a curved plane substantially coincident with that of the dished support 19, the said shifting being generally along an arc the center of which is at a point located approximately at the focal point of the headlight being tested. The spring element 25 is backed by a collar 30 loosely fitted on the tubular hub element 27, while the said collar is held against longitudinal displacement by the spacer 29 on the one side and a retainer 31 fitted into the hub element on the opposite side thereof.

Slidably fitted within the tubular hub element 27 is an elongated shaft 32 to the forward extremity of which is fixed, by means of a bracket 33, the "photronic" cell 13 or other similar light sensitive cell, this cell being electrically wired, in the manner well understood by those skilled in the art of using such cells, to an electrical measuring instrument 34 mounted externally of the casing 11, preferably by means of a ball-and-socket connection 35 to facilitate arrangement of the instrument to the best convenience of the operator of the apparatus. The shaft 32 carrying the light sensitive cell 13 is provided at its outer extremity with a threaded shank 36 of reduced diameter which passes through a suitable bearing 37 fixed in the rear end of the tubular hub element 27. A coiled compression spring 38 surrounding the threaded shank 36 and interposed between the opposed faces of the shaft 32 and the bearing 37 normally urges the said shaft forwardly along the axis of the tubular hub element 27. A nut 39 threaded upon the shank 36 serves to retract the shaft 32 against the action of the coiled compression spring and thus by rotating said nut in one direction or the other the light sensitive cell may be shifted axially toward and away from the test reflector or target 12.

Normally, the shaft 32, while free to shift axially of the tubular hub element 27 under the influence of the control knob 39, is restrained against rotation relatively to said hub by means of a key 40 secured to the shaft and slidable within an elongated slot 41 suitably provided in the hub. The said key is notched, as at 42, to provide an index, while the edge of the slot 41 is graduated to provide a scale 43 with which the index cooperates to facilitate and note axial adjustments of the light sensitive cell in the manner and for the purpose to be described hereinafter.

Secured to the tubular hub 27 in non-rotative relation with respect thereto is a vertically extending arm 44 the lower extremity of which is provided with a relatively wide flat surface 45. As appears most clearly in Figure 3, this surface is provided with a graduated scale 46 reading in opposite directions from a point marked zero (0). Pivotally secured to the upper extremity of the arm 44, as at 47, is a pointer 48 the pointed lower end of which is designed to traverse the scale 46 in one direction or the other to indicate the tilt of the test reflector axis with respect to the horizontal. Carried by the tilt scale pointer 48 adjacent its pivotal support 47 is a circular liquid bubble level 49 disposed normally in a substantially horizontal plane, the glass window of the level being marked by intersecting lines 50—51 to indicate the true center thereof.

It will be apparent that by turning the arm 44 in clock-wise or counter-clockwise direction corresponding rotation will be imparted to the shaft 32 and consequently the "photronic" cell 13 carried by the latter. By manipulating the arm 44 so as to locate the level bubble 52 on the line 50 aforesaid, assurance is had that the "photronic" cell 13 is properly leveled with respect to the horizontal. Once this position is attained it may be maintained by means of the locking set screw 53 to be referred to hereinafter. Thereafter, by swinging the tilt scale pointer 48 in one direction or the other to locate the bubble along the line 51 so that said bubble is at the true center of the level, a reading may be obtained on the tilt scale 46 showing the extent of tilt of the test reflector axis relatively to the horizontal.

At this point it will be observed that the "photronic" cell 13 is provided in the face thereof which presents toward the test reflector 12 with an opaque shutter 54 having formed therein a transversely extending narrow slit 55. The arrangement is such that only so much of the light rays reflected by the test reflector 12 is permitted to influence the cell as is necessary for satisfactory operation of the apparatus. During the operations of testing the headlight, the cell 13 is so normally positionally adjusted that the light-transmitting slit 55 thereof is horizontally disposed, this position being determined, of course, by the location of the bubble 52 in the liquid level 49. So long as said bubble is located on the line 50 of said level, the light-transmitting slit 55 of the cell is in proper horizontal position.

As most clearly appears in Figures 3 to 9, inclusive, means are provided interiorly of the casing 11 for effecting lateral and vertical positional adjustment of the test reflector 12 along arcs substantially paralleling the curved plane of the dished support 19. This means will now be described, it being observed that the tubular hub element 27 is fitted with a block 56 of the character best shown in Figures 9 and 12. This block is normally non-rotatably secured to the tubular hub element 27 by means of the set screw locking member 53 heretofore mentioned. The forward end of the block 56 is shaped to provide a substantially square seat 57 from the front face of which axially projects an annular hub 58. Loosely fitted upon the squared seat 57 of the block 56 are a pair of slotted plates 59 and 60, these plates being arranged in closely spaced parallel relation.

Figures 5, 6, 7:
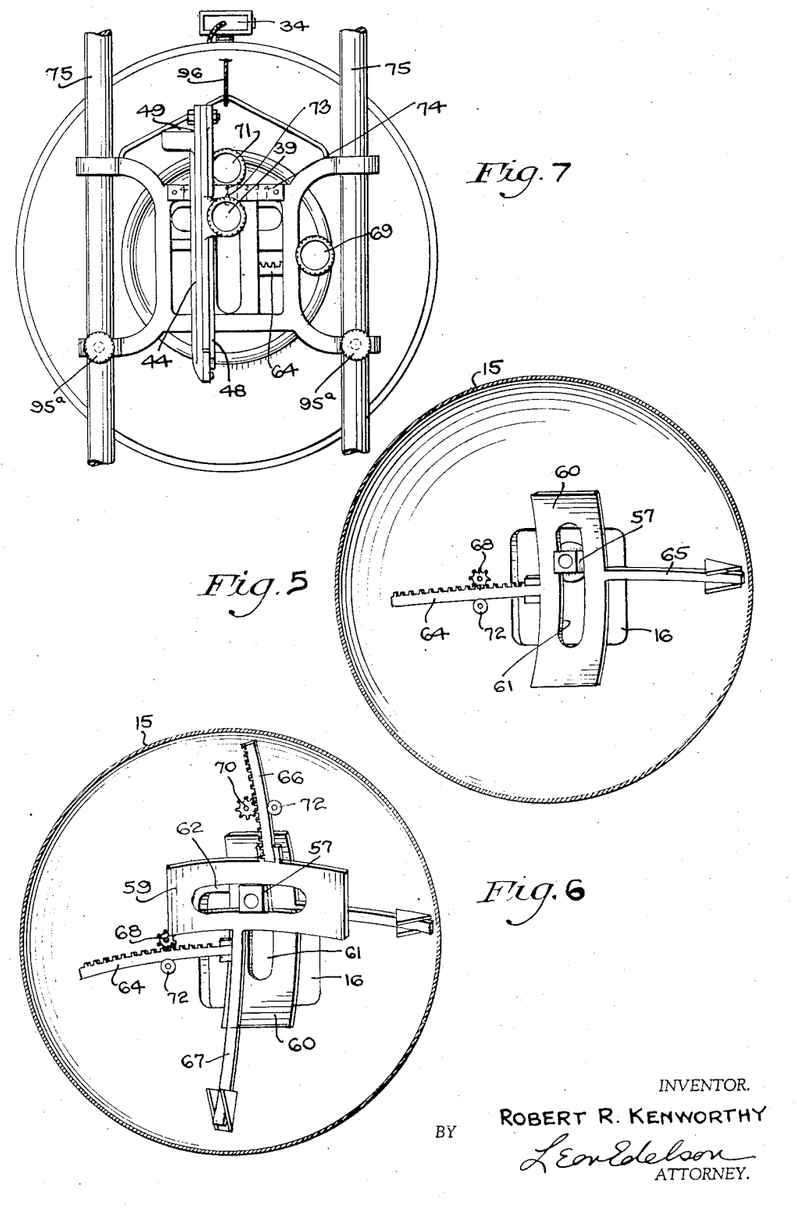
Figure 5 is a transverse sectional view taken approximately along the line 5—5 of Figure 3 showing the mechanism for effecting lateral adjustment of the test reflector or target.
Figure 6 is a transverse sectional view also taken approximately along the line 5—5 of Figure 3 showing the additional mechanism for effecting vertical adjustment of the test reflector.
Figure 7 is a rear elevational view of the testing head of the apparatus.
Figure 8:
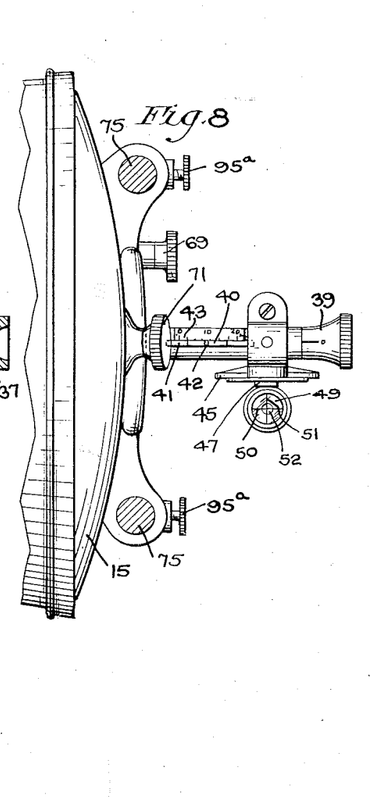
Figure 8 is a top plan view of the rear portion of the testing head showing the externally operated adjusting instrumentalities of the apparatus.

As most clearly appears in Figure 5, the rearmost plate 60 is provided with an elongated slot 61 extending in vertical direction while as appears most clearly in Figure 6 the foremost plate 59 is provided with an elongated slot 62 extending in horizontal direction. The said plates 59 and 60 are thus disposed with their respective elongated slots arranged in intersecting relation, the squared portion 57 of the block 56 being projected commonly through said slots 61 and 62. A retainer 63 secured in any suitable manner to the annular head 58 of the block 56 serves to prevent displacement of the said plates 59 and 60 axially from the squared portion 57 of the block 56. As will be apparent from an examination of Figures 5, 6 and 9 in particular, the arrangement of the slotted plates 59 and 60 upon the squared portion 57 of the block 56 is such that said block is free to be shifted by means of the plate 59 in one direction or another along the slot 61 of the plate 60 at the same time that it is free to be shifted by means of the plate 60 in one direction or another along the slot 62 of the plate 59. It will be understood, of course, that shifting of the block 56 along one or the other of the said slitted plates 59 and 60 will result in corresponding shifting of the test reflector 12 inasmuch as the latter is fixed to and carried by the tubular hub element 27 commonly with the said block 56.

As is shown most clearly in Figure 5, the plate 60 is provided with a rack 64 extending laterally from one side thereof and with a guide arm 65 extending laterally from the opposite side thereof. Similarly, as appears most clearly in Figure 6, the plate 59 is also provided with a rack 66 extending laterally from one side thereof and with a guide arm 67 extending from the opposite side thereof. Operatively associated with the rack 64 is a pinion 68 which is adapted to be rotated in clockwise or counter-clockwise direction by means of a knob 69 located externally of the rear cover plate 15 of the casing 11. The rack 66 is likewise provided with a suitably journalled pinion 70 which is rotatable in one direction or the other by means of an externally located knob 71 (see Figure 7). The racks 64 and 66 are each suitably backed to prevent flexing due to lateral thrust by suitably journalled guide rollers 72, this being most clearly shown in Figure 11. Also, it will be observed that the racks 64 and 66 are each of arcuate shape to conform generally to the curvature of the arcuate path of movement of the test reflector 12.

It will be apparent from the foregoing that by manipulating the external knob 69 at the rear of the casing 11 in one direction or the other, the test reflector 12 may be shifted horizontally, while upon manipulating the external knob 71 the test reflector may be shifted vertically. By conjoint manipulation of both knobs 69 and 71, it is, of course, possible to shift the test reflector 12 into any desired adjusted position within the limits permitted by the slotted plates 59 and 60. The plate 60, which is laterally shiftable by means of the knob 69 to effect horizontal positional adjustment of the test reflector, is provided with an index pointer 73 (see Figures 7 and 9) which traverses a graduated scale 74 suitably fixed upon the rear of the casing 11, this scale being graduated to read in opposite directions from a central zero (0) point. The said pointer 73 and the scale 74 provide, of course, indications as to the extent of lateral deflection of the light beam toward the center of the road or toward the ditch side thereof.

From the foregoing description of the testing head per se, it will be apparent that instrumentalities have been provided for positionally adjusting the test reflector or target as may be desired as well as for axially and angularly adjusting the "photronic" cell 13. In addition, means have been provided for determining the degrees of angular, horizontal and vertical deviations from any predeterminedly established normal position of the test reflector and for determining the axial displacement of the cell from a predetermined or known normal position. In addition to these adjustments, the testing head is bodily adjustable both vertically and horizontally by means now to be described and shown most clearly in Figures 1 to 3 and 13 to 16, inclusive.

This last-mentioned means comprises generally an upright frame or standard for the testing head having a pair of laterally spaced parallel rods 75—75, the upper ends of which are rigidly connected together by a top cross bar 76. Pivotally connected, as at 77 (see Figure 2) to the midpoint of this cross-bar 76 is an arm 78, the rear end of which latter is in turn pivotally connected, as at 79, to a rear brace 80. Provided at the lower ends of the laterally spaced rods 75—75 is a horizontally extending bar 81 of substantial length having at each end thereof a foot or supporting member 82. The bar 81 is preferably of T-shaped cross-section and is turned on its side so as to provide an upwardly extending flange 83 constituting a track for a pair of flanged roller wheels 84—84. These latter are journalled in tandem relation upon a bracket member 85 which is provided with a pair of laterally spaced rearwardly projecting ears 86—86 to which are respectively pivoted the lower ends of the upright rods 75—75. Projecting rearwardly from the bracket member 85 is a rod 87 carrying at its free outer extremity a roller wheel 88. The lower end of the rear brace 80 is pivoted to the said rod 87, as at 89.

As most clearly appears in Figures 2, 15, 16 and 17, the horizontally disposed flange 90 of the T-bar 81 supports upon its upper surface a plate 91 equipped at either end thereof with caster-type rollers 92—92. This plate 91 is adapted to be clamped flat-wise against its supporting base flange 90 by means of a threaded stud 93 coacting with a nut 94 having an enlarged manipulating head or grip 95. When the plate 91 is thus clamped tightly against its supporting base flange 90, the bar 81 is elevated above the floor and the supporting frame for the testing head is free to be moved from one position to another upon the rollers 88 and 92—92. When, however, the supporting frame is in proper testing position, the nut 94 may be loosened in consequence of which the frame drops of its own weight into the position shown in Figure 16 with the feet 82 of the base thereof in direct contact with the floor. In this latter position, the apparatus is relatively immobile. The testing head 10 is supported by the rods 75—75 of the frame and is vertically adjustable thereon. Set screws 95ᵃ—95ᵃ are provided for locking the testing head in such vertically adjusted position. In order to effect this vertical adjustment of the testing head on the rods 75—75 with vernier accuracy, the testing head is connected by a cable 96 to a shive or drum 97 journalled upon the top cross bar 76 of the supporting frame and arranged for rotation by a hand wheel 98. Thus, by loosening the set screws 95ᵃ—95ᵃ and rotating the said hand wheel 98, the testing head may be raised or lowered at will and so accurately adjusted to the desired testing elevation.

Figure 1:
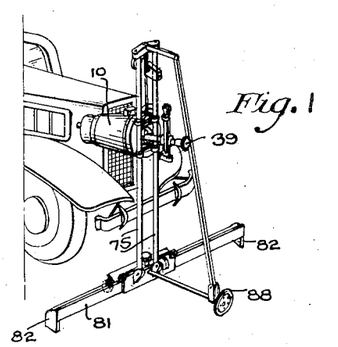
Figure 1 is a perspective view showing the apparatus of the present invention located in operative position with relation to a head-light to be tested.
Figures 2, 15, 16, 17:
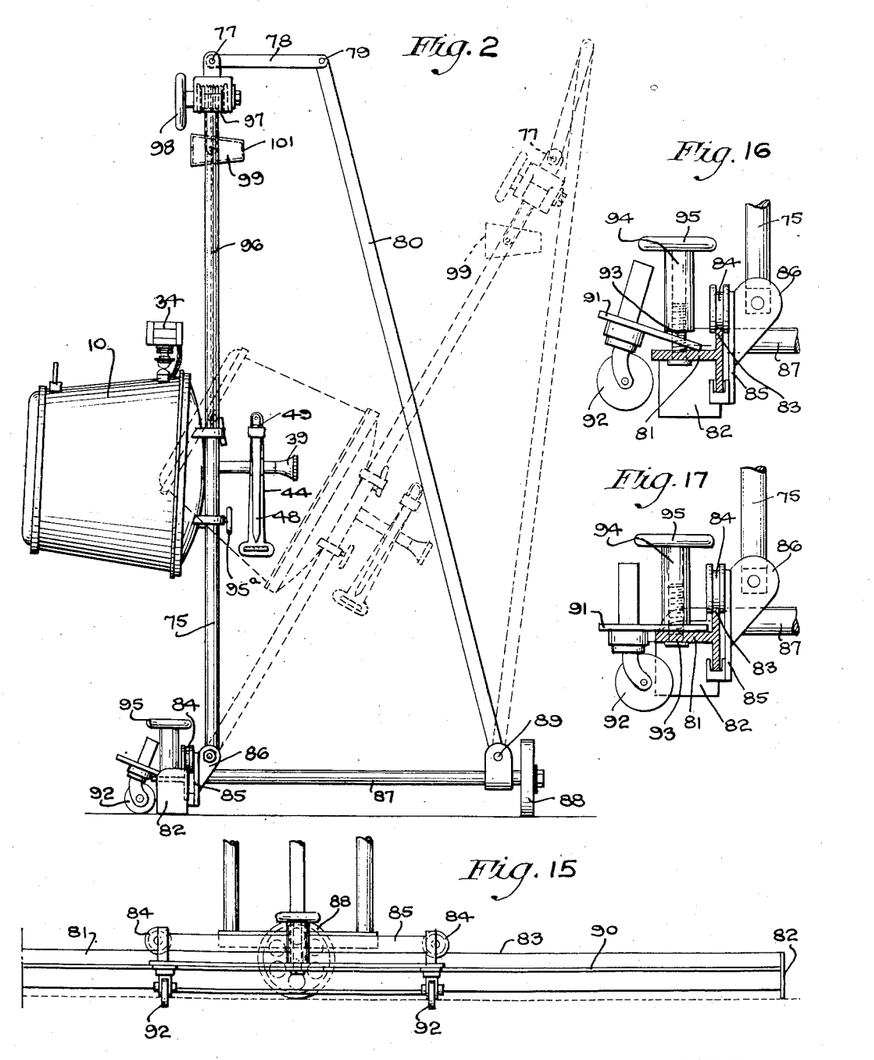
Figure 2 is a side elevational view of the apparatus.
Figure 15 is a front view of the lower portion of said supporting frame.
Figures 16 and 17 are transverse sectional views of the frame portion of Figure 15 showing, respectively, the frame base firmly founded on the floor to support the apparatus while testing and raised off the floor for transport to some other location of test.

It will be understood that when the frame of the apparatus is dropped into the position shown in Figures 16 so that it is relatively, immovable, the upper part of the frame including particularly the rods 75—75 which support the testing head 10 is movable laterally along the horizontal track 83 of the frame base. This movement is of sufficient lateral extent to enable the testing head to be shifted laterally from in front of one headlight of an automobile to a position in front of the other headlight thereof. In order to insure such freedom of movement without interference by any protruding frontal parts of the vehicle the supporting frame may be tilted away from the vehicle into the dotted line position shown in Figure 2, this being effected simply by breaking the toggle connection at the pivotal point 77. Even when the frame is thrown into the said dotted line position so as to definitely clear the test head from any obstructions which may be encountered in the course of its movement laterally across the front of the vehicle the rearwardly tilted frame is freely movable along the track 83.

Figures 4, 13:
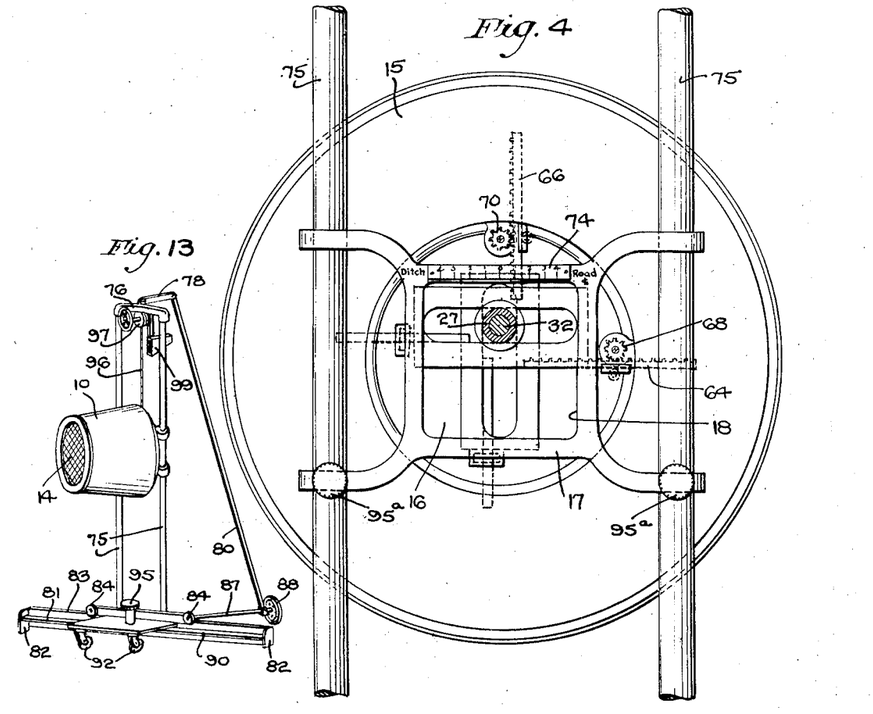
Figure 4 is a transverse sectional view of the testing head of the apparatus taken on the line 4—4 of Figure 3.
Figure 13 is a perspective view of the apparatus as a whole.
Figure 14:
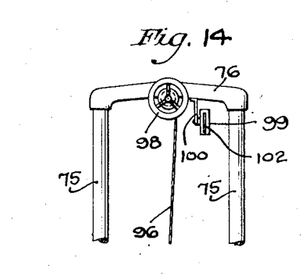
Figure 14 is a front view of the upper portion of the supporting frame for the testing head.

As most clearly appears in Figures 2, 13 and 14, the frame is provided adjacent the top thereof with a sight box 99 suitably pivoted upon a bracket 100 secured to the upper cross bar 76 of the frame. Any suitable means may be provided for frictionally retaining the sight box 99 in adjusted position, the sight box being generally of the type having a peep hole 101 in its rear end and a vertical slit 102 in its front end. By sighting through the rear and front peep sights 101 and 102 along a central line of the vehicle or some other line parallel thereto, the apparatus as a whole may be accurately located so that the front plane of the testing head lies in a plane at right angles to the longitudinal axis of the vehicle. In its normal operation, the apparatus is located so that the testing head is in approximate alignment with and fairly close to the particular headlight undergoing test, the apparatus being then adjusted through the use of the sight box 99 to insure accurate positioning of the apparatus in relation to the longitudinal axis of the vehicle.

In the use of the present apparatus for testing headlights it will be understood that the various makes of headlights generally in use will have been calibrated and the calibrations so ascertained will have been noted on a chart somewhat as follows:

| Make of lamp | Focus | Tilt | Meter reading |
|---|---|---|---|
| Bi Ray | 10 | +5 | 20 |
| Control Beam R | | | |
| Control Beam L | | | |
| Depress Beam | 7 | −6 | 35 |
| Flex Beam R | 9 | −4 | 35 |
| Flex Beam L | 9 | −4 | 35 |
| Glolite | 8 | −8 | 30 |
| Golden Glow | 10 | −5 | 30 |
| Guide Ray | 10 | −2 | 30 |
| Multibeam R | 9 | −6 | 30 |
| Multibeam L | 9 | −4 | 35 |
| Parabeam | 8 | +5 | 30 |
| Riteway | 10 | −11 | 35 |
| Ryan Lite, tilt with screw | 10 | −13 | 30 |
| Solar R | 8 | −3 | 30 |
| Solar L | 10 | −3 | 30 |
| Stabilite | 8 | −3 | 35 |
| Super Safe R | 10 | −11 | 20 |
| Super Safe L | 9 | −2 | 25 |
| Tilt Ray | 10 | −6 | 25 |
| Tri Beam R | 9 | −4 | 20 |
| Tri Beam L | 7 | −6 | 15 |
| Twilite | 8 | −5 | 25 |
| Twolite | 10 | −6 | 25 |
| Twin Beam (keep lamp face vertical) | 10 | −6 | 35 |
| Woodlite (cover top ⅞″ of lens) | 3 | −13 | 20 |

It will be understood that the values as set forth in the above calibration chart are but illustrative and in actual practice may be different from those as given in the chart. With this chart before him the operator will proceed with the testing of a headlight substantially in accordance with the following procedure, it being assumed for purposes of illustration that the headlight undergoing test is that designated in the above chart by the name "Stabilite."

The first step in the procedure is to roll the apparatus on its wheels 88 and 92—92 into a position in front of the vehicle the headlights of which are to be tested. The operator then sights through the sight box 99 along the longitudinally extending axis of the vehicle, preferably along the central hinge line of the engine hood. When properly aligned the handle nut 94 on the caster plate 91 is released so as to permit the base rail 81 to engage the floor. With the apparatus thus in relatively fixed position on the floor, the operator shifts the super structure of the frame laterally along the track 83 so as to present the testing head approximately in front of the lamp to be tested, the testing head being adjusted vertically as may be necessary by means of the hand wheel 98 and the cable 96. This effects an approximate adjustment of the testing head to align it axially with the lamp to be tested.

Thereafter, the tilt knob 71 at the rear of the testing head is rotated in one direction or another to obtain the highest possible reading on the meter 34, it being understood, of course, that the reading on the meter scale is influenced by the intensity of the light beam which is projected from the headlight under test to the test reflector 12 within the casing 11 and reflected by said test reflector through the slit 55 of the "photronic" cell unit and upon the light sensitive element thereof. Having obtained this maximum reading in the meter 34 by the adjustment of the tilt knob 71 the operator then manipulates the said tilt knob and the hand wheel 98 in conjunction with each other to secure a final maximum reading in the meter 34. Having secured this final maximum reading, the testing head is securely locked in its vertically adjusted final position on the rods 75—75 by means of the set screws 95a—95a.

Following this procedure the lateral control knob 69 and the focal control knob 39 are independently and jointly adjusted to increase, if possible, the reading obtained on the meter 34. Following this, the set screw 53 (see Figure 9) should be loosened and the tubular hub element 27 together with the test reflector 12 and the "photronic" cell 13 should be rotated as a unit through an arc of approximately fifteen degrees in both clockwise and counter-clockwise directions, the set screw 53 being tightened to lock the hub elements 27 in position when the maximum reading is obtained in the meter 34. Having made these several adjustments, namely, the vertical tilt adjustment by manipulating the tilt knob 71, the lateral adjustment by manipulating the lateral control knob 69, the focal adjustment by manipulating the focus control knob 39 and the angular adjustment of the sleeve 27 about its longitudinal axis by manipulating the arm 44, the final reading on the meter is noted and should this reading be less than the value set forth in the last column of the chart such as that given above, it will then be known that the headlight requires attention. In the case of the Stabilite headlight, this final meter reading should be 35 or higher.

At this point, the operator should note the pointer indication on the lateral scale 74 (see Figures 4 and 7). This scale is graduated in degrees and is intended to indicate the angular deviation of the light beam toward the ditch and toward the center of the road. In a properly adjusted headlight the pointer indication should be at the zero mark or midpoint of the scale and in no event should the scale indicate a deviation of more than one degree either toward the road center or toward ditch.

Having made the aforesaid adjustment and observations, the operator then swings the tilt scale pointer 48 about its pivot 47 to center the bubble 52 at the point of intersection of the intersecting lines 50 and 51 of the level. In order to so locate the bubble at the exact center point of the level, it may be necessary to readjust the hub element 27 angularly about its axis, this being accomplished by loosening the set screw 53 to permit such angular readjustment of the member 27. If the resultant displacement of the bubble from the exact center of the level is insignificant, such displacement may be ignored. However, if the resultant displacement of the bubble from the exact center of the level is pronounced, the indication is that the lamp has a sagging filament or that the lens is twisted, or that either the reflector or lamp of the headlight is mounted in twisted position. In the event of any such defect, its correction would then be taken care of before continuing with the testing of the lamp.

Assuming that the bubble is properly centered in the level upon adjustment of the tilt scale pointer 48 the indication on the tilt scale 46 is then noted and to this is added or deducted the figure set forth in the tilt column of the above chart. For example, in the case of the Stabilite headlight, assuming that the tilt scale showed a tilt figure of eight there would be subtracted from this figure three (obtained from the chart) to give a resultant tilt of five, which would mean that the light beam has a drop of five inches in twenty-five feet. The minimum drop of the light beam is established by law in practically all States and the indicated drop in the light beam of the headlight undergoing test should in no event be less than that permitted by law.

Following this last observation the operator would note the reading on the focus scale 43 (see Figure 8) which should conform, for a particular headlight, to the value set forth in the focus column of the above chart. In the case of the Stabilite headlight, the required focus reading is eight, and the reading obtained on the focus scale 43 should not vary more than one-half point above or below the required value on focusable lamps nor more than one and one-half points either way on fixed focus lamps.

Lamps failing to conform to the chart as indicated above should be readjusted or reconditioned as may be required. If the condition of the headlight is such as to require positional readjustment of the various elements thereof, such as the reflector, the lamp, the lens or the whole headlight as a unit then various controls of the present apparatus are respectively set at their proper points for a given headlight. Thus, in the case in the Stabilite headlight cited as an example, the focusing knob 39 would be adjusted to set the index 42 at the point 8 of the focus scale. In addition, the tilt scale pointer 48 would be swung to that point on the tilt scale 46 known to be normal for the Stabilite headlight. With the pointer 48 set at this point of the tilt scale 46 the vertical tilt knob 71 is next adjusted so as to present the level bubble at the exact geometric center of the level 49. In addition, the lateral shift control knob 69 is adjusted to present the lateral scale index 73 at the zero point of the lateral scale 74.

Having made all of these adjustments, the testing head is not further disturbed but instead all of the elements thereof are maintained in such adjusted position while the headlight and the various adjustable elements thereof are separately and conjointly adjusted to obtain the maximum reading on the meter 34. Having obtained the maximum reading on the meter 34 for each adjustment of the several adjustable parts of the headlight under test, the adjustment of the headlight as a whole will have been completely, satisfactorily and accurately effected.

From the foregoing description, it will be noted that the present apparatus includes a multiple number of controls which operate conjointly to insure the adjustment of the test reflector or target into a position wherein its axis substantially coincides with the reflector axis of the headlight under test, thus insuring that the light beam reflected from the target is geometrically coaxial with that projected directly from the headlight. The principal individual adjustments provided for in the present apparatus to accomplish the desired objectives with facility and mathematical accuracy are, first, axial adjustment of the light sensitive cell toward and away from the reflector target; second, angular adjustment of the light sensitive cell and reflector target, as a unit, about the axis of the latter; third, adjustment of the reflector target arcuately in the vertical plane of the axis of the latter; fourth, adjustment of the reflector target arcuately in the horizontal plane of said axis; fifth, vertical adjustment of the testing head bodily as desired; and sixth, lateral adjustment of the testing head bodily as desired. In addition to this control for effecting positional adjustment, the apparatus includes individual scales for respectively indicating or determining the degree of focal displacement; the degree of lateral displacement of the light beam to one side or the other of normal; and the degree of tilt of the light beam axis. By coordinating these controls and scales as hereinbefore described, extremely accurate observations may be made determinative of the operating characteristics and general efficiency of any lighting unit tested.

It will be understood that while the particular apparatus shown and described is a preferred construction, it is but illustrative of the general principles of the present invention and it will be understood accordingly that the apparatus as shown may be modified in various respects without departing from the general principles or real spirit of the present invention.

What is claimed as new and useful is:

1. A head-light testing apparatus including a main support, a reflecting target mounted on said support and adapted to intercept and reflect the light beam projected from the head-light being tested, means for positionally adjusting the target with respect to said support to present its axis substantially parallel to the principal axis of said light beam, a light sensitive device disposed axially in advance of said target and adapted to intercept a limited part of the reflected light, means for positionally adjusting said light sensitive device relatively to said target and means for measuring the effect of said intercepted light upon said light sensitive device.

2. A head-light testing apparatus including a main support, a reflecting target for the light beam to be tested mounted on said support, means for positionally adjusting said target with respect to said support to present its axis substantially coaxial with the principal axis of the light beam, a light sensitive cell arranged to intercept a limited portion of the light reflected from said target, means for positionally adjusting said light sensitive device relatively to said target and a measuring instrument operatively associated with said cell to indicate when the latter is influenced to maximum degree by said intercepted light.

3. A head-light testing apparatus of the character defined in claim 2 wherein said means for positionally adjusting said target includes an instrumentality for effecting lateral shifting of the target in the horizontal plane of the target axis and along an arc the center of which is located approximately at the focal point of the head-lamp being tested.

4. A head-light testing apparatus of the character defined in claim 2 wherein said means for positionally adjusting said target includes an instrumentality for effecting vertical shifting of the target in the vertical plane of the target axis and along an arc the center of which is located approximately at the focal point of the head-lamp being tested.

5. A head-light testing apparatus including a positionally adjustable reflecting target for the light beam to be tested, said target being of generally parabolic form, an enclosing shell for said target means operable from the exterior of the shell for shifting said target in any direction along an arcuate path the center of which latter is located approximately at the focal point of the head-light being tested, a light-sensitive cell adapted to intercept and be influenced by light reflected from said target, an electric meter for measuring the effect of said light upon said cell, and means for adjustably positioning said cell in advance of said target.

6. A head-light testing apparatus including a positionally adjustable reflecting target for the light beam to be tested, said target being of generally parabolic form, an enclosing shell for said target means operable from the exterior of the shell for shifting said target in any direction along an arcuate path the center of which latter is located approximately at the focal point of the head-light being tested, a light-sensitive cell adapted to intercept and be influenced by light reflected from said target, an electric meter for measuring the effect of said light upon said cell, and means for adjustably positioning said cell in advance of said target, said last-mentioned means including a mechanism for rotating said cell angularly about the axis of the target.

7. A head-light testing apparatus including a positionally adjustable reflecting target for the light beam to be tested, said target being of generally parabolic form, an enclosing shell for said target means operable from the exterior of the shell for shifting said target in any direction along an arcuate path the center of which latter is located approximately at the focal point of the head-light being tested, a light-sensitive cell adapted to intercept and be influenced by light reflected from said target, an electric meter for measuring the effect of said light upon said cell, and means for adjustably positioning said cell in advance of said target, said last-mentioned means including a mechanism for shifting said cell axially along the axis of said target.

8. A head-light testing apparatus including a positionally adjustable target for the light beam to be tested, a light sensitive cell arranged in advance of said target, said cell being enclosed in a casing having a slitted opening extending transversely of the vertical plane of the target axis through which light reflected from said target may enter to influence said cell, means for adjusting said cell axially of and angularly about said target axis, means for measuring the effect of the reflected light upon said cell, and means for ascertaining the angular and axial displacements of said cell when said cell is influenced by the intercepted light to maximum degree.

9. A head-light testing apparatus including a positionally adjustable target of generally parabolic form for the light beam to be tested, an enclosing shell for the target, a light sensitive cell arranged to intercept and be influenced by light reflected by said target, means for measuring the effect of the reflected light upon said cell, and means operable from the exterior of the shell, for positionally adjusting said target to provide for maximum measurable effect of the light upon said cell.

10. A headlight testing apparatus including a positionally adjustable reflecting target of generally parabolic form for the light beam to be tested, an enclosing shell for the target, a light sensitive cell operatively associated with said target and adapted to be influenced by light reflected from the target, an electric meter for measuring the effect of the light influencing said cell and means operable from the exterior of the shell for positionally adjusting said target and said cell in accordance with predeterminedly established positions for a given headlight of normally operating characteristics whereby when the light beam from a headlight of similar type is projected upon said positionally adjusted target the said headlight including the component parts thereof may be adjusted to so direct its beam as to provide for maximum measurable effect upon said cell.

11. A headlight testing apparatus including a main housing, a positionally adjustable reflector of generally parabolic form disposed interiorly of said housing, a light sensitive cell also disposed within said housing and arranged to intercept and be influenced by light reflected from said reflector, means disposed externally of said housing and operatively associated with said cell for measuring the effect of the reflected light upon said cell, and a plurality of controls arranged externally of the housing for positionally adjusting said reflector within its housing and said cell with respect to said reflector to provide for maximum measurable effect of the light upon said cell when said housing is disposed in line with and in close proximity to the headlight to be tested.

12. A headlight testing apparatus including a main housing, a positionally adjustable reflector of generally parabolic form disposed interiorly of said housing, a light sensitive cell also disposed within said housing and arranged to intercept and be influenced by light reflected from said reflector, means disposed externally of said housing and operatively associated with said cell for measuring the effect of the reflected light upon said cell, and a plurality of controls arranged externally of the casing for positionally adjusting said reflector within its housing and said cell with respect to said reflector to provide for maximum measurable effect of the light upon said cell when said housing is disposed in line with and in close proximity to the headlight to be tested, said housing being provided with an opening in the front thereof through which light emanating from said headlight to be tested is projected upon said reflector.

13. A headlight testing apparatus including a main housing, a positionally adjustable reflector of generally parabolic form disposed interiorly of said housing, a light sensitive cell also disposed within said housing and arranged to intercept and be influenced by light reflected from said reflector, means disposed externally of said housing and operatively associated with said cell for measuring the effect of the reflected light upon said cell, a plurality of controls arranged externally of the casing for positionally adjusting said reflector within its housing and said cell with respect to said reflector to provide for maximum measurable effect of the light upon said cell when said housing is disposed in line with and in close proximity to the headlight to be tested, and a supporting frame for said housing including vertically extending supporting means upon which said housing is adapted to be slidably adjusted and means for locking said housing in vertically adjusted position.

14. A head-light testing apparatus including a positionally adjustable reflecting target for the light beam to be tested, said target being of generally parabolic form, an enclosing shell for said target, said shell having an opening through which light is projected upon said target, means operable from the exterior of said shell for shifting said target in any direction along an arcuate path the center of which latter is located approximately at the focal point of the head-light being tested, and means for indicating variations in the intensity of the light reflected by said target and for establishing a position for said target in which a maximum amount of light is reflected thereby.

15. A head-light testing apparatus including a positionally adjustable reflecting target for the light beam to be tested, an enclosing shell for the target, means operable from the exterior of the shell for shifting said target in any direction along the arc of a circle the center of which is located approximately at the focal point of the head-light being tested, a light sensitive cell adapted to be positionally adjusted to intercept and be influenced by light reflected from said target to provide for maximum measurable effect of the light upon said cell, and means for indicating the maximum light intercepting position of said cell.

16. A head-light testing apparatus of the character defined in claim 15 wherein said indicating means includes a spirit level operative to indicate vertical tilt or inclination of the light beam.

ROBERT R. KENWORTHY.